United States Patent [19]

Negus et al.

[11] Patent Number: 5,173,908
[45] Date of Patent: Dec. 22, 1992

[54] SYSTEM FOR AUTOMATICALLY ADJUSTING THE GVD OF A GIRES-TOURNOIS INTERFEROMETER

[75] Inventors: Daniel K. Negus, La Honda; Timothy Johnston, Mt. View, both of Calif.

[73] Assignee: Coherent, Inc., Palo Alto, Calif.

[21] Appl. No.: 772,481

[22] Filed: Oct. 7, 1991

[51] Int. Cl.$^5$ .......................................... H01S 3/098
[52] U.S. Cl. ...................................... 372/18; 372/20; 372/25; 372/92; 372/98; 372/29; 372/39; 372/99; 372/33
[58] Field of Search ................... 372/18, 20, 25, 33, 372/39, 29, 92, 98, 99

[56] References Cited

U.S. PATENT DOCUMENTS

| | | | |
|---|---|---|---|
| 3,675,154 | 7/1972 | Duguay et al. | 372/102 |
| 3,679,313 | 7/1972 | Rosenberg | 372/25 |
| 3,696,310 | 10/1972 | Paoli et al. | 372/18 |
| 4,727,553 | 2/1988 | Fork et al. | 372/25 |

OTHER PUBLICATIONS

P. M. W. French, G. F. Chen, & W. Sibbett, "Tunable Group Velocity Dispersion Interferometer for Intracavity and Extracavity Applications," *Optics Communications*, vol. 57, No. 4, Mar. 15, 1986, pp. 263-268.
J. Heppner, & J. Kuhl, "Intracavity Chirp Compensation in a Colliding Pulse Mode-Locked Laser Using Thin-Film Interferometers," *Appl. Phys. Lett*, vol. 47, No. 5, Sep. 1, 1985, pp. 453-455.
P. Laporta, & V. Magni, "Dispersive Effects in the Reflection of Femtosecond Optical Pulses From Broadband Dielectric Mirrors," *Applied Optics*, vol. 24, No. 13, Jul. 1, 1985, pp. 2014-2020.
A. M. Weiner, J. G. Fujimoto, & E. P. Ippen, "Compression and Shaping of Femtosecond Pulses," *Ultrafast Phenomena IV*, Ed. D. H. Auston, K. B. Eisenthal, Springer-Verlag (1984), pp. 11-15.
S. De Silvestri, P. Laporta, & O. Svelto, "Effects of Cavity Dispersion on Femtosecond Mode-Locked Dye Lasers," *Ultrafast Phenomena IV*, Ed. D. H. Auston, K. B. Eisenthal, Springer-Verlag (1984), pp. 23-26.

*Primary Examiner*—Léon Scott, Jr
*Attorney, Agent, or Firm*—Limbach & Limbach

[57] ABSTRACT

A system is described for automatically maintaining the group velocity dispersion (GVD) of a Gires-Tournois interferometer (GTI) as the wavelength of incident light is varied. In the system, the transmission through the GTI is monitored by a photodiode as the wavelength is varied. The transmission through the GTI provides a measure of its GVD. Thus, the output of the photodiode can be used as a control signal for adjusting the GTI in a manner to maintain its GVD at the desired level. The subject system is illustrated in conjunction with a pulsed, tunable, Ti:sapphire laser which is passively mode locked with the optical Kerr effect. The system allows the wavelength of the laser to be tuned over the bandwidth of the gain medium while maintaining a selected level of GVD from the GTI which in turn maintains the desired duration of the pulses. In addition, the GTI is used to compensate for the dispersion effects created by broad band optics in the resonator.

15 Claims, 5 Drawing Sheets

SYSTEM FOR AUTOMATICALLY ADJUSTING THE GVD OF A GIRES-TOURNOIS INTERFEROMETER

TECHNICAL FIELD

The subject invention relates to a feedback system for maintaining the group velocity dispersion of a Gires-Tournois interferometer as the wavelength of laser light incident on the interferometer is varied. In addition, the Gires-Tournois interferometer is utilized to compensate for the dispersion effects created by broad band reflective optics.

BACKGROUND OF THE INVENTION

There is significant interest in developing tunable, pulsed lasers. It is well known that the pulses in these lasers can be compressed or chirped by controlling the dispersion effects in the laser cavity. Controlling the amount of negative group velocity dispersion (GVD) in a cavity can be particularly important if soliton-like pulse shaping is desired.

Various optical elements have been used to control the dispersion effects in a laser cavity. For example, a pair of separated prisms have a negative group velocity dispersion which can be varied by varying the position of the prisms with respect to the traversing laser beam. (See U.S. Pat. No. 4,727,553 issued Feb. 23, 1988 to Fork) For high levels of negative group velocity dispersion over a narrow bandwidth, a Gires-Tournois interferometer can be used. A Gires-Tournois interferometer is, in essence, a type of etalon. Details concerning the use of a Gires-Tournois interferometer both within and outside of a resonant cavity to control pulse formation can be found in "Intracavity chirp compensation in a colliding pulse mode-locked laser using thin-film interferometers," Heppner and Kuhl, *Applied Physics Letters*, Vol. 47, No. 5, Page 453, Sept. 1, 1985 and "Tunable group velocity dispersion interferometer for intracavity and extracavity applications," French et al, *Optics Communications*, Vol. 57, No. 4, page 263, Mar. 15, 1986.

Figure 1:
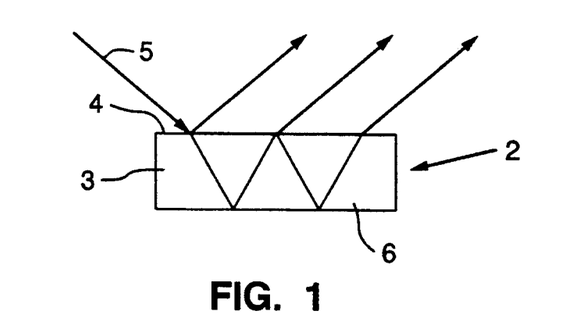
FIG. 1 is a schematic diagram of one type of Gires-Tournois interferometer.

As described in the latter articles and illustrated in FIG. 1 herein, a basic Gires-Tournois interferometer 2 consists of a substrate 3 having an index of refraction greater than air. The surface 4, upon which the laser beam 5 is incident, may be coated to be partially reflecting of the light. The rear surface 6 of the substrate is coated with a high reflecting coating. The magnitude and sign of the group velocity dispersion of this structure is varied by tilting the substrate with respect to the incident beam so that the path length of the beam within the substrate is changed. The structure can be used as an end mirror or an intermediate mirror in a laser cavity.

Figure 2:
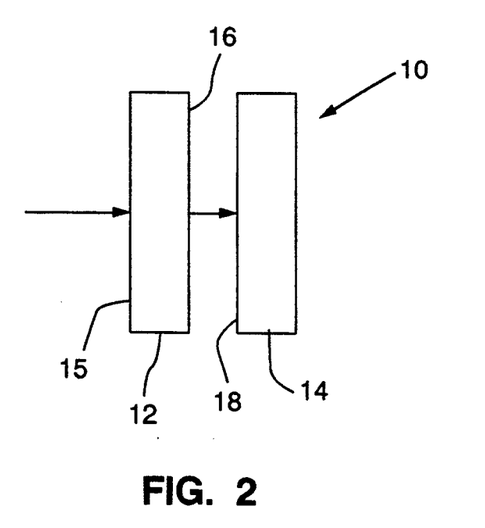
FIG. 2 is a schematic diagram of an alternate type of Gires-Tournois interferometer.

Another type of Gires-Tournois interferometer 10 is illustrated in FIG. 2 and consists of pair of separated plates 12 and 14. The surface 15 of plate 12 upon which the laser beam is incident must be highly transmissive. High transmission is achieved either with an antireflection coating or by orienting the surface at Brewster's angle. The inner surface 16 of plate 12 is provided with a relatively low level of reflectivity. The inner surface 18 of plate 14 is defined as a high reflector. In this version of the Gires-Tournois interferometer, the GVD is varied by changing the spacing between the plates.

Figure 3A:
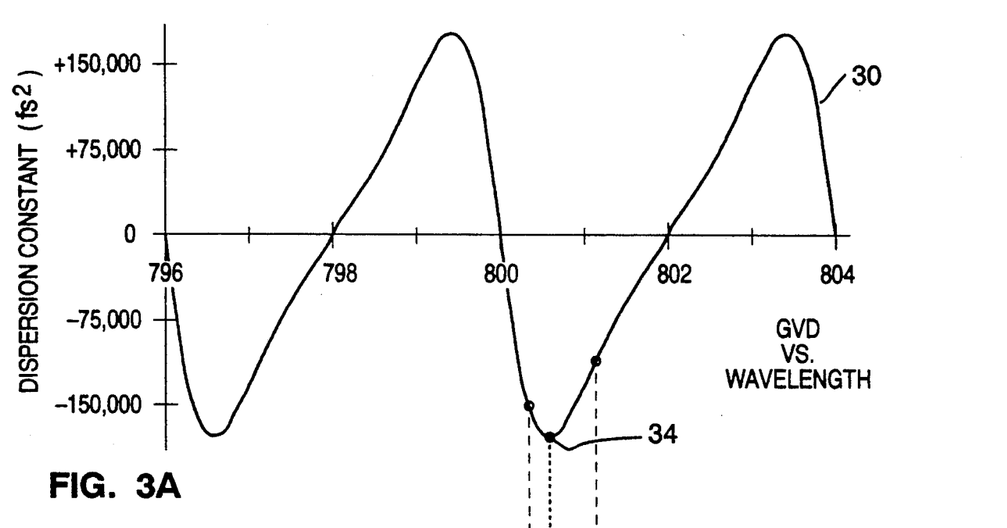
FIGS. 3a and 3b contain a pair of graphs showing the typical relationship between the GVD of a Gires-Tournois interferometer and the transmission through a Gires-Tournois interferometer.

In both of the interferometer structures shown in FIGS. 1 and 2, the group velocity dispersion is also dependent upon the wavelength of light incident thereon. FIG. 3a is a graph plotting the variation of the group velocity dispersion of a Gires-Tournois interferometer with respect to the wavelength of the incident light. As can be seen from curve 30, this dependence is periodic in nature. The variation in group velocity dispersion with wavelength poses a significant practical problem when using a Gires-Tournois interferometer in a tunable pulsed laser. More specifically, in order to form highly stable soliton-like pulses, the group velocity dispersion must be accurately controlled and maintained. Unfortunately, as the wavelength of the laser is tuned, the GVD of the Gires-Tournois interferometer will vary. This effect will cause the pulse formation to become unstable to the point that the laser will no longer operate in the pulsed mode. In order to reestablish pulsed behavior, the Gires-Tournois interferometer would have to be readjusted to achieve the desired GVD for the selected wavelength. Accordingly, it would be desirable to create a system for maintaining the desired GVD of a Gires-Tournois interferometer as the wavelength of the laser is tuned.

Another issue of concern in broadly tunable, short pulsed lasers is the selection of resonator optics. More particularly, consideration must be given to selecting coatings which will not create their own dispersion effects as the laser is tuned. Under present day coating technology, coatings which are relatively dispersion free are also relatively narrow band with respect to the available tuning ranges. For example, a laser having a Ti:sapphire gain medium is tunable from about 670 nm to 1.08 microns. In the present commercial embodiment of Coherent's Ti:sapphire lasers, three complete mirror sets are provided to cover the tuning range. For example one set will cover 670 to 800 nm, the next set 800 to 940 nm and the third set is used to cover the remainder of the range.

If a customer wishes to tune the laser over the entire range, the entire mirror sets must be changed twice. In at least one model of Coherent's laser, there are a total of nine mirrors in the resonator. Even the most experienced technician requires at least 30 minutes to change and realign a nine mirror set. For most customers who perform the task less frequently, changing the mirror set can take hours. Clearly, it would be desirable to be able to utilize mirrors with broader bands of reflectivity.

A typical narrow band reflector is formed from a series of alternating layers of high and low index materials each having an optical thickness of a quarter wave associated with the center frequency of the narrow band. For coatings having a reflectivity range significantly broader than 100 nm, at least two quarter wave stacks are used. The first stack is optimized for one wavelength while the second stack is optimized for another wavelength. Alternatively, a broad band coatings can include layers where the optical thickness progressively changes. Such broad band coatings have been used in steering optics outside the laser. However, the prior art literature clearly teaches that such multistack coatings should not be used inside the resonator of a short pulsed laser because the dispersion effects they create will broaden the pulses and inhibit stable operation. Accordingly, it would be desirable to design a mode locked laser system which permitted the use of resonator optics with broad band coatings so the mirrors sets would not have to be changed over the tuning range of the laser.

Therefore, it is one object of the subject invention to provide a method of automatically adjusting a Gires-Tournois interferometer.

It is a further object of the subject invention to provide a method of automatically maintaining the group velocity dispersion of a Gires-Tournois interferometer.

It is another object of the subject invention to provide a method of operating a tunable pulsed laser wherein the wavelength of the laser can be tuned without disruption of the mode locking process and without varying the duration of the pulses.

It is still another object of the subject invention to provide a mode locked laser having broad band reflective optics.

It is still a further object of the subject invention to provide a mechanism for compensating for the dispersion effects of a broad band optical coating used in the resonator of a pulsed laser.

It is still another object of the subject invention to utilize a Gires-Tournois interferometer to compensate for the dispersion effects created by a broad band reflective optical coating.

SUMMARY OF THE INVENTION

In accordance with these and many other objects, the subject invention provides a method for maintaining the GVD of a Gires-Tournois interferometer as the wavelength of the incident light is varied. The subject invention is based on the discovery that the transmission through the high reflecting surface of a Gires-Tournois interferometer is also a function of the wavelength of the light. This transmission function can be correlated to the changes in GVD of the interferometer caused by the change in the wavelength of the incident light. Thus, by monitoring the changes in transmission through the Gires-Tournois interferometer, the interferometer can be adjusted to maintain the desired GVD.

In one of the illustrated embodiments, the subject invention is used in a tunable titanium-sapphire laser of the type described in U.S. application, Ser. No. 07/632,360, filed Dec. 21, 1990, now U.S. Pat. No. 5,079,772, incorporated herein by reference. The latter application discloses a laser that is passively mode-locked utilizing the optical Kerr effect. The laser includes a prism sequence providing the negative group velocity dispersion necessary to generate and sustain femtosecond pulses. In order to generate soliton-like pulses in the picosecond regime in the latter laser, much higher negative group velocity dispersion is required. This requirement can be appreciated from an equation set forth in the latter patent and reproduced herein as follows:

$$P_{soliton} = |\beta|/\gamma \tau^2 \qquad (1)$$

where P is the peak power of the pulse, $|\oplus|$ is a parameter related to the magnitude of the GVD from linear material and optical system contributions, $\gamma$ represents the non-linear phase shift per unit length per unit power from self-phase modulation (proportional to $n_2$ and the interaction length) and $\tau$ is the FWHM of the pulse. As can be seen, to maintain a constant peak power of the laser, the negative GVD must be increased in proportion to the square of the increase in the duration of the pulse.

It is quite difficult to generate the large negative GVD necessary for picosecond pulses using a prism sequence. Accordingly, in order to operate in the picosecond regime, the prism sequence has been replaced with a Gires-Tournois interferometer. The GVD of the interferometer is controlled in accordance with the subject invention so that the wavelength of the laser can be tuned over the range of the Ti:sapphire gain medium while the mode-locking behavior is sustained.

Another advantage to the use of a Gires-Tournois interferometer in the subject laser is that its adjustability can be used to compensate for dispersion effects created by broad band optical coatings. As noted above, in the prior art, relatively narrow band coatings having single quarter wave stacks have been utilized. Broader wavelength range coatings that are defined by two or more quarter wave stacks or progressively varying thicknesses have been avoided because of the dispersion effects created by those mirrors. It can be shown that in at least the picosecond regime, the dispersion effects created by multistack broad band mirrors can be compensated by adjusting the group velocity dispersion of the Gires-Tournois interferometer thereby maintaining the desired pulse width and operational stability.

DETAILED DESCRIPTION OF THE PREFERRED EMBODIMENTS

Figure 3B:
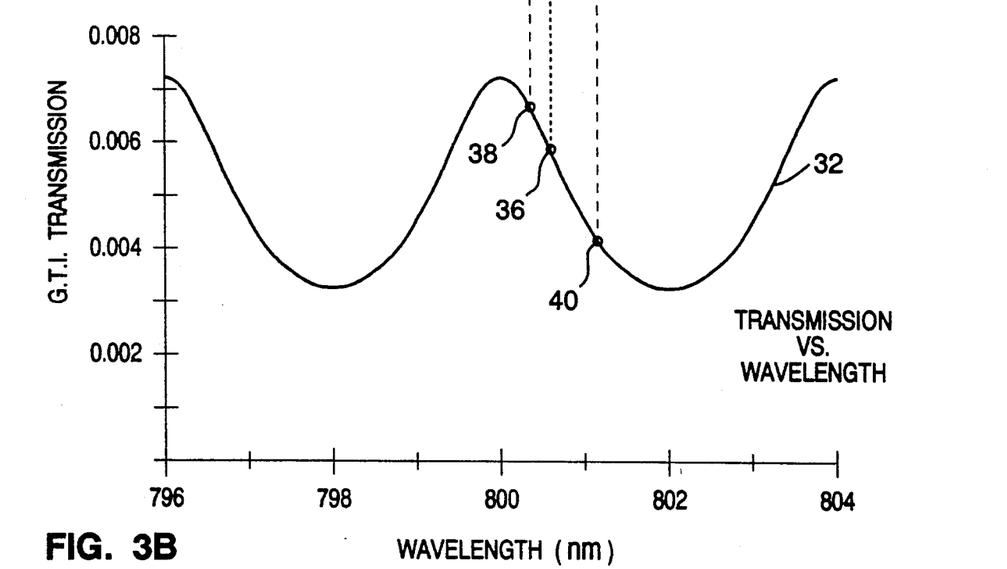

Referring to FIG. 3b, there is illustrated a plot of the variation in the transmission of a Gires-Tournois interferometer (GTI) as a function of wavelength. The transmission level represented by curve 32 in this graph is the power of light passing through the high reflecting surface of the interferometer. In the interferometer shown in FIG. 1, this would be surface 6 of substrate 3. In the interferometer of FIG. 2, this would be surface 18 of plate 14.

It should be noted that the theory and analysis in prior references on Gires-Tournois interferometers assumed that the high reflecting surface was a total reflector. In practice, a "total" reflecting coating will typically be about 99.9 percent reflective. Even the minimal transmission which occurs through this type of surface is sufficient for the transmission measurements of the subject invention provided the intracavity power is sufficient. In the embodiment discussed below with respect to FIG. 5, the high reflecting surface was set to be 99.5 percent reflective in order to maintain a reasonably constant transmission level across the tuning range.

FIGS. 3a and 3b, when taken together illustrate the relationship between the variation in GVD of the Gires-Tournois interferometer and the variation in transmission through the Gires-Tournois interferometer. The specific relationship between the GVD and transmission functions is based on the actual structure of the particular GTI. The relationship illustrated in FIG. 3 is derived from the GTI discussed below with respect to FIG. 5. Regardless of the particular structure of the GTI, some relationship exists between GVD and transmission and that relationship is independent of the adjustment position of the GTI. Therefore, a given transmission level will correspond to a particular level of GVD for the particular GTI.

This relationship can be better understood by referring to the data points in FIG. 3 for the two curves 30 and 32. More specifically, point 34 is located at a minimum of curve 30 and represents a level a maximum negative GVD. Point 34 of curve 30 corresponds to point 36 of curve 32 which represents a transmission level of 0.0058 (0.58%) through the high reflecting surface. In the example in the Figure, points 34 and 36 also correspond to a wavelength of 800.5 nm for a given adjustment position of the GTI. As can be seen, if the wavelength of the laser were varied to 801.2 nm (and the GTI was not adjusted), the negative GVD and the transmission levels would both be reduced. To compensate for the change in GVD, the GTI can be adjusted to produce a maximum negative GVD at the new wavelength. As noted above, since the relationship between the levels of transmission and GVD remain the same through adjustment of the GTI, if the GTI was readjusted to produce the maximum negative GVD, the transmission through the GTI would also be back at 0.0058. Alternatively, if the Gires-Tournois interferometer were adjusted to maintain a given transmission level, then a particular level of negative GVD would also be maintained.

As noted above, it is an object of the subject invention to maintain the GVD of a GTI at a selected value as the wavelength of laser light is varied. In a tunable laser, the wavelength is varied by an optical element (eg. birefringent tuner) so that the wavelength of light incident on the Gires-Tournois interferometer will change. If the change in transmission level through the GTI is being monitored, a feedback signal can be generated that can be used to adjust the interferometer. In the device illustrated in FIG. 1, tuning is accomplished by varying the angle of the element 3 with respect to the beam. In this case, a configuration would be used so that a change in the angle of element 3 would not simultaneously misalign the laser oscillator. In the device illustrated in FIG. 2, tuning is accomplished by varying the separation between the plates. This adjustment will have the effect of shifting the curves in FIG. 3 with respect to the wavelength. For the type of GTI shown in FIG. 2, a peak of the GVD can be linearly shifted to the wavelength corresponding to an adjacent peak by changing the distance between the plates by $\lambda/2$. This adjustment can be accomplished easily with a PZT. The interferometer can be adjusted until the desired transmission through the interferometer (and the desired GVD) is reacquired.

In the example discussed above, the transmission point 36 selected was matched to the maximum negative GVD value of the interferometer. As set forth in equation (1), for a constant P and $\gamma$, the maximum negative GVD will produce the longest pulses. If shorter pulses are desired, the amount of negative GVD should be reduced. This can be accomplished by setting the operation point of the laser at a different transmission level which matches a different level of GVD. This flexibility is limited by a desire to have the GVD over the bandwidth of the pulse be fairly linear. In the illustrated embodiment, points 38 and 40 have been empirically determined to represent transmission levels associated with the outer regions of the curve 30 in which the group velocity dispersion is sufficiently constant for optimum operation. Operation at either of these points, as compared to point 34, will produce shorter pulses. In practice, the course selection of pulse width is controlled by the separation of the plates in the interferometer which determines the magnitude of the GVD at the extrema. Fine calibration of pulse width can be achieved through the selection of the transmission level through the interferometer by varying the gap spacing an amount approximately equal to $\lambda/8$.

Figure 4:
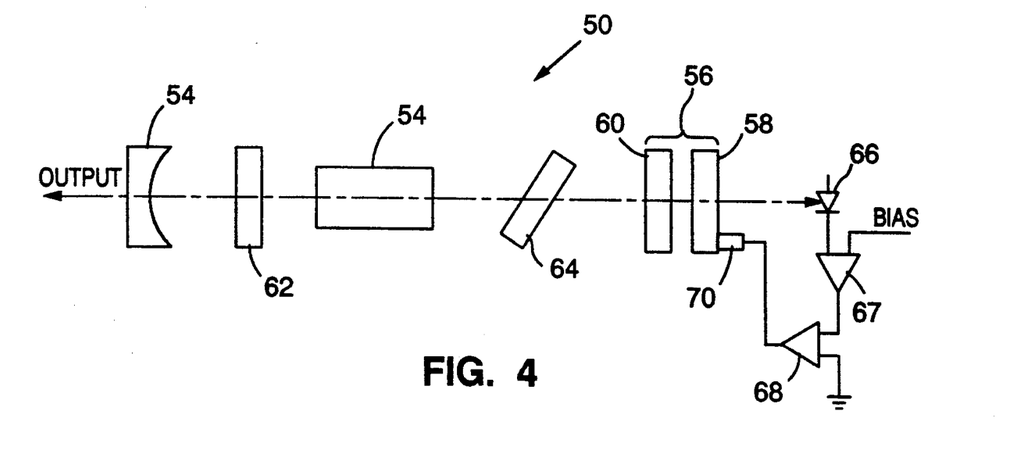
FIG. 4 is a schematic diagram of a basic laser system including a Gires-Tournois interferometer which is operated in accordance with the subject invention.

FIG. 4 is a schematic diagram of a laser system 50 utilizing the subject invention. The laser system includes a gain medium 52 located within a resonant cavity. The cavity is defined at one end by an output coupler 54. The high reflector of the resonator is defined by a Gires-Tournois interferometer 56. The GTI 56 illustrated in FIG. 4 is of the type illustrated in FIG. 2 and has two plates, 58 and 60. The laser cavity is further provided with a mode locking device 62 for creating pulses. The wavelength of the light is tuned with a birefringent tuner 64.

In accordance with the subject invention, a means is provided for monitoring the transmission through the high reflecting surface of the GTI. In the illustrated embodiment, the transmission is monitored by a photodiode 66. The millivolt output of the photodiode is supplied to a comparator 67 and a gain and compensation amplifier 68. A bias voltage is supplied to comparator 67 to allow the servo loop to be operated at any corresponding desired photodiode voltage. The output of the amplifier is supplied to a PZT 70 which is operatively connected to the GTI. Motion of the PZT 70 will translate a plate of the GTI thereby varying the spacing between the plates and varying the GVD of the GTI. Amplifier 70 also provides sufficient gain to drive the PZT 70.

In operation, the laser is initially adjusted to generate pulses of the desired duration. This adjustment will include varying the spacing of the plates 58 and 60 of the GTI to obtain a given GVD. This spacing will also produce a given transmission level which is detected by the diode 66.

The operator will then tune the wavelength of the laser by adjusting the BRF 64. As noted above, when the wavelength is tuned, the GVD and the transmission through the GTI will vary. If the GTI was not adjusted, the duration of the pulses would change. In accordance with the subject invention, the change in transmission through the GTI is monitored by the diode 66. The diode and amplifier 68 generates a discriminant signal which is fed back to the PZT 70 for adjusting the GTI. The GTI is adjusted in a manner to maintain the originally selected transmission level and hence the originally selected level of GVD. By this arrangement, the duration of the pulses will be maintained at the desired width as the wavelength is varied.

Figure 5:
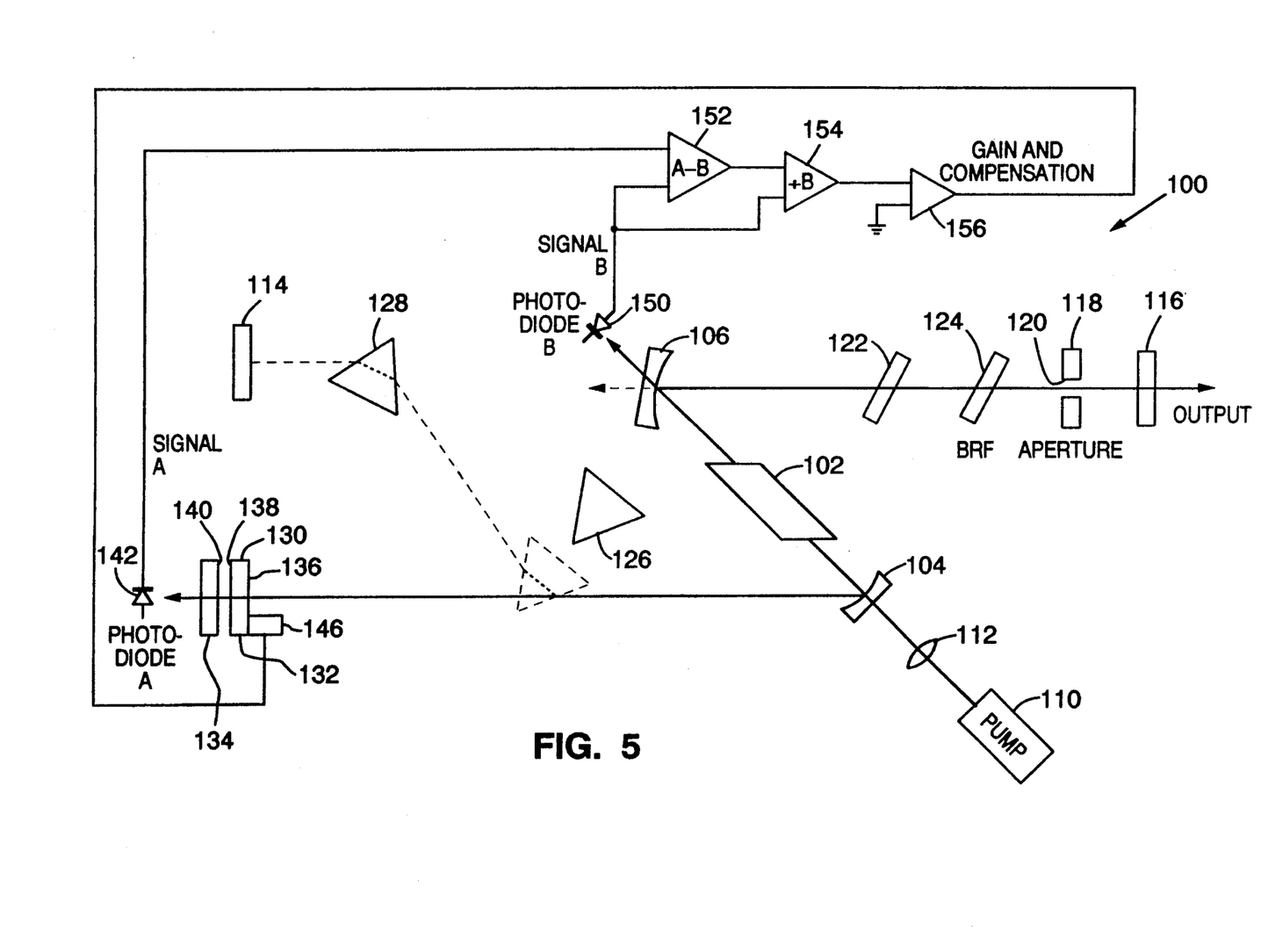
FIG. 5 is a schematic diagram of a titanium-sapphire laser system which is passively mode-locked utilizing the optical Kerr effect and which utilizes a Gires-Tournois interferometer to shape the pulses, and wherein the interferometer is operated in accordance with the subject invention.

FIG. 5 illustrates the preferred embodiment of the subject invention, incorporated into a tunable pulsed laser 100 that is passively mode locked using the optical Kerr effect. As noted above, this laser is described in greater detail in U.S. application Ser. No. 07/632,360. Briefly, the laser includes a gain medium 102 formed from titanium:sapphire. The gain medium is located in a focusing branch of the resonator defined by a pair of spherical mirrors 104 and 106. The gain medium is pumped by a CW argon laser 110 (or other suitable pump source). The pump light is coupled into the cavity through a lens 112 and mirror 104.

The primary resonant cavity is defined by a high reflector 114 and an output coupler 116. A plate 118 having an aperture 120 is provided to enhance the Kerr effect self mode locking behavior of the laser. A BRF filter 122 is provided to tune the laser. An optical element 124 is provided which is rotatable to cause a change in the path length of the resonator. Element 124 is used to initiate mode locking as described in copending application Ser. No. 07/697,898, filed May 9, 1991, and incorporated herein by reference. In the commercial embodiment, additional fold mirrors (not shown) are provided to reduce the size of the package.

As described in the prior application, a pair of prisms 126 and 128 are mounted in the cavity for supplying negative GVD and creating soliton-like pulse shaping. The level of GVD created by the prisms is varied by moving the prisms with respect to the laser beam. To achieve this movement, one of the prisms is mounted on a translation stage (not shown). With the prism 126 located in a position as illustrated in phantom line in FIG. 5, the light path is bent through prism 128 and directed to reflector 114. With the prism pair in the cavity, the laser will generate pulses in the femtosecond regime.

In order to generate pulses in the picosecond regime, a Gires-Tournois interferometer 130 is used to supply a much higher negative GVD. The GTI includes a pair of spaced plates 132 and 134. The surface 136 of plate 132 upon which the beam is incident is provided with an antireflection coating. The inner surface 138 of plate 132 is uncoated and provides a reflectivity of approximately 0.04. The reflectivity of surface 140 of plate 134 was 0.995.

In order to insert the GTI in the cavity, the prism 126 is translated entirely out of the beam path as shown in solid line in FIG. 5. In this position, the beam will reflect off mirror 104 and be directed to the GTI. In this configuration, the GTI acts as the high reflector end of the cavity.

The operation of the GTI is similar to that described above with respect to FIG. 4. The transmission through the high reflector surface is monitored by a photodiode 142. The output signal generated by the diode 142 is ultimately used to adjust the GTI so that the desired level of negative GVD is maintained. The spacing between the plates of the GTI is adjusted using a PZT 146 mounted on plate 132. It may be desirable to mount the PZT on the inner of the two plates so that adjustment of the GTI will not vary the length of the cavity.

When the output wavelength of a laser of the type shown in FIG. 5 is tuned, the power in the cavity will vary across the tuning range of the gain medium. This variation as well as other power fluctuations (such as those caused by pump laser power or alignment variations) must be isolated from the variation in transmission created by the GTI (due to wavelength changes or small gap spacing variations). To achieve this goal, the feedback circuit should include a means for normalizing the measurement of transmission through the GTI with respect to the variations in intracavity power.

Normalization can be performed by monitoring the intracavity power. As illustrated in FIG. 5, a photodiode 150 is positioned beyond one of the fold mirrors 106. The output of the diode 150 is subtracted from the output of diode 142 by amplifier 152. The result of the subtraction is to give a true measure of transmission related to the GTI alone. The resultant output is then supplied to a second amplifier 154 which divides the signal by the intracavity power. The result of this division normalizes the variations of the power over wavelength. The output of amplifier 154 is supplied to a gain and compensation amplifier 156 which generates a control signal that operates the PZT 146.

Figure 6:
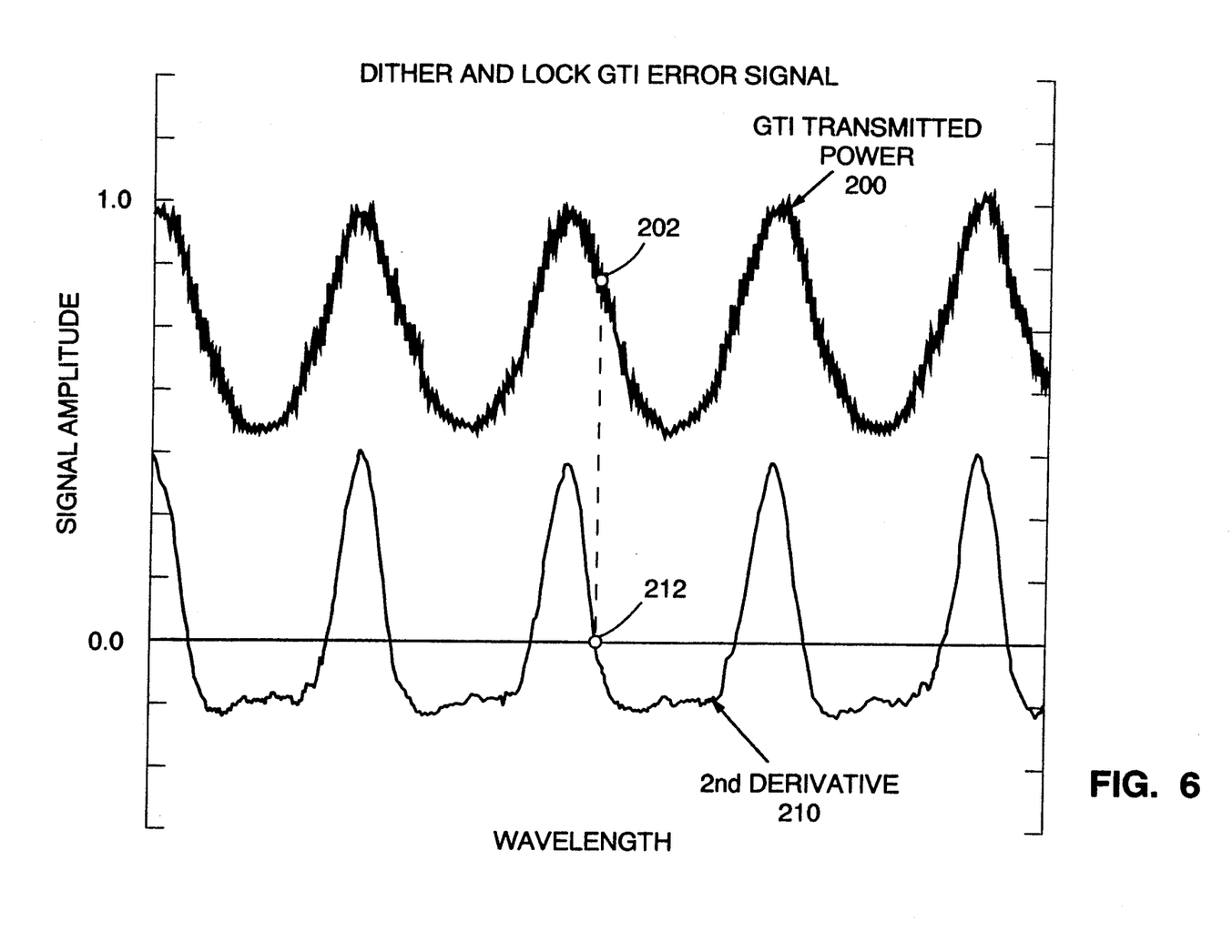
FIG. 6 is a graph of experimental data illustrating the relationship between the transmission through the Gires-Tournois interferometer and the second derivative of that signal with respect to wavelength.
Figure 7:
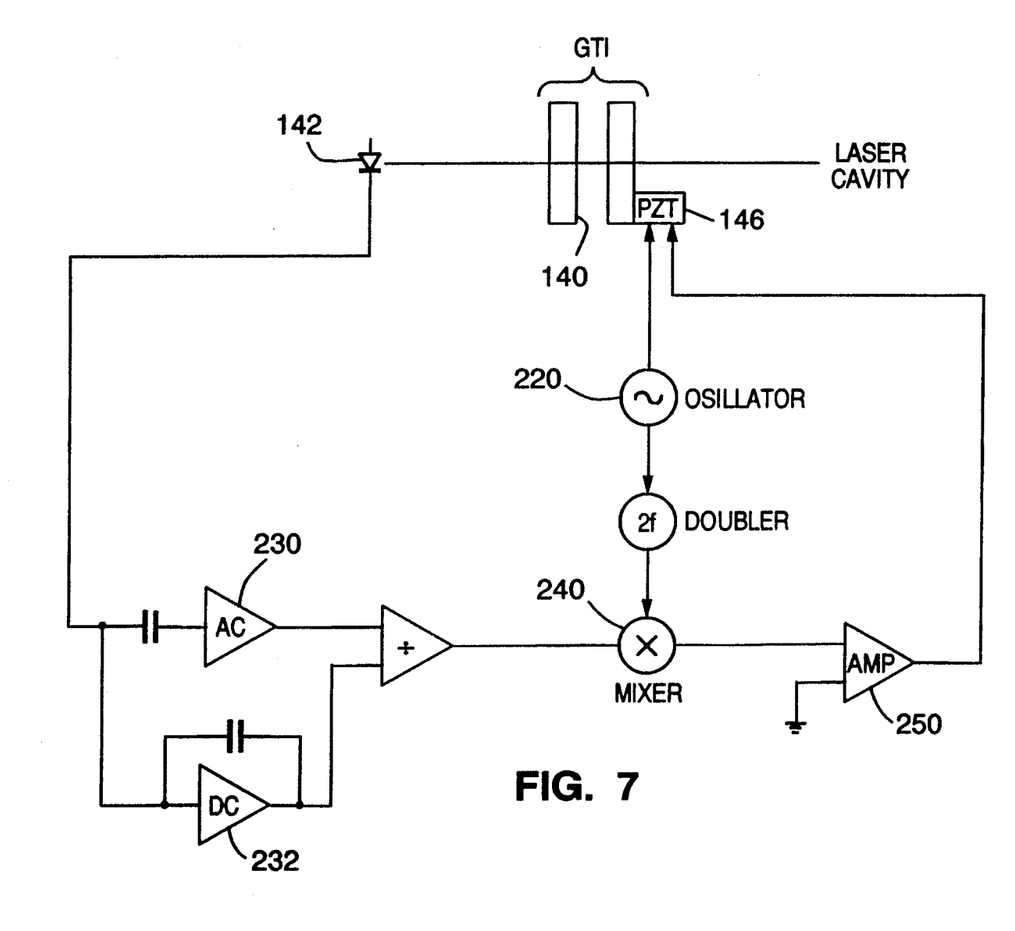
FIG. 7 is a schematic diagram of a dither and lock circuit which can be used to maintain the group velocity dispersion of the Gires-Tournois interferometer at the desired level.

One drawback to the normalization approach shown in FIG. 5 is that the coatings on mirror 106 and surface 140 of the GTI must be matched with great precision so their performance over the range of wavelengths will be equivalent. In order to overcome this drawback, a different approach for generating a discriminant signal from the GTI is illustrated in FIGS. 6 and 7.

In this system, the PZT controlling the spacing of the GTI is driven by an oscillator as part of a dither and lock circuit. The lock point is based on the zero crossing of the second derivative of the transmission signal with respect to the gap spacing. This lock point corresponds to the maximum negative GVD of the GTI.

As can be appreciated from FIG. 3, point 36 on curve 32, corresponding to maximum negative GVD, is located approximately at the maximum slope of the curve. Since the region of maximum slope is an extrema of the first derivative, the second derivative of that signal will produce a zero crossing in that region. This relationship is illustrated in FIG. 6 wherein curve 200 represents the transmission function through the GTI (and is a portion of curve 32 from FIG. 3). Point 202 on curve 200 corresponds to the transmission level associated with the maximum negative GVD. Curve 210 is a plot of the second derivative of the transmission function. As can be seen, a zero crossing occurs at a point 212 corresponding to maximum negative GVD (point 202 on the transmission curve).

Based on the above described relationship, a dither and lock circuit can be employed to hold the transmission level of the GTI at the zero crossing point of the second derivative signal. Since the absolute transmission value is not used, the discriminant signal will be isolated from the variations in the intracavity power of the laser.

One form of suitable dither and lock circuit is shown in FIG. 7 and would be used in place of the elements 152, 154 and 156 as shown in FIG. 5. As seen in FIG. 7, the output of a sine wave oscillator 220 would be supplied to PZT 146 to dither the separation of the GTI. The amount of dither (gap space variation) would be on the order of $\lambda/30$. The transmission through the GTI is measured by the diode 142 and supplied to a pair of amplifiers 230 and 232. The output of amplifiers 230, 232 are divided so that the DC component of the output signal is filtered and only the normalized AC component of the signal is fed to a mixer 240. Mixer 240 also combines a frequency doubled signal from oscillator 240 to generate the second derivative signal. The second derivative signal output is gated to amplifier 250 which compares the signal to ground. The output of amplifier 250 is used as a feedback signal to the PZT 146 for maintaining the GTI at the maximum level of negative GVD. If some other level of GVD is desired, a suitable post mixer bias signal can be supplied to the GTI.

Since the dither and lock of FIG. 7 will vary the group velocity dispersion of the GTI, some level of variation in the width of the pulse will be introduced. In order to avoid this variation, the dither and lock circuit can be used to initially find the proper set point for the GTI and thereafter, the circuit can be disabled. In this case, the desired group velocity dispersion can be maintained by switching to a servo loop similar to the one shown in FIG. 4.

In operation, the laser is initially adjusted to generate the pulses of the desired duration. As the operator varies the wavelength of the laser, the feedback circuit functions to maintain the transmission level of the GTI in a manner such that the duration of the pulses will not vary.

An another advantage to the subject system is that the it can used to facilitate the initiation of mode-locking behavior. As noted above, mode-locking behavior will only occur if the proper negative GVD is present in the cavity. Further, the proper set point for the GTI is different for each wavelength. Accordingly, to first start the laser mode locking at a new frequency (as opposed to tuning a laser which is already mode locking to a new frequency), it was necessary to adjust the GTI while attempting to repeatedly initiate mode-locking with the starter mechanism. In practice, a significant amount of trial and error was necessary to find the correct setting for the GTI to allow mode-locking to be initiated.

This trial and error approach can be eliminated by first empirically determining the level of transmission through the GTI which is associated with the maximum negative GVD. As noted above, this level of transmission will be constant for all wavelengths. Using the detection system of the subject invention, the desired level of transmission of the GTI (and therefore the desired level of negative GVD) can be set while the laser is operated in the CW mode.

In use, the BRF would first be adjusted to select the desired operation wavelength. The control circuit would then be used to deliver a specific voltage to PZT 146 which will produce the selected level of transmission through the GTI. This selected transmission level will correspond to the desired level of negative GVD for the selected wavelength. At this point the starting mechanism is activated and mode locking behavior can easily be initiated.

In another aspect of the subject invention, one or more of the resonator mirrors are provided with relatively broad band optical coatings. By broad band optical coating it is meant that the coating includes at least two quarter wave stacks each optimized for different wavelengths or a systematic progression of quarter wave thicknesses. The coating should reflect light over at least 200 nm but preferably would reflect light with a minimum of absorption over the entire range of the Ti:sapphire gain medium.

Any optical coating having two or more quarter wave stacks or a multiple layers with a progression of varying thicknesses will generate a significant level of dispersion in the beam. The dispersion effects are based on the fact that different frequencies will be reflected differently with respect to the initial phase by the coatings. Since the short pulses of a mode locked laser have a very large frequency bandwidth, any significant dispersion from the mirrors will place a chirp on the pulse changing its characteristics.

As noted in the prior art, since the bandwidth of a femtosecond pulse is quite broad, the dispersion effects of broad band mirrors will be quite complex and severe and therefore difficult to compensate. On the other hand, the bandwidth of a picosecond pulse is significantly narrower and therefore the dispersion effects are smaller and generally more linear. In the configuration of the subject laser, the GTI provides a mechanism for significantly altering the group velocity dispersion in the cavity an amount sufficient to correct for the latter dispersion effects.

In accordance with the subject invention, the laser may be outfitted with broad band reflective optics and the GTI can be used to compensate for the dispersion effects of the coatings as the laser is tuned. The level of adjustment necessary from the GTI will depend on the particular mirror coatings and the operation wavelength. However, it has been demonstrated that the change in spacing of the GTI needed to compensate for the dispersion of the optics is quite small and can be accomplished with the fine GVD adjustment range provided by the PZT.

As can be appreciated, in order to simplify the operation of the laser, it would be desirable to use broad band coatings on all of the resonator mirrors. In this fashion, none of the mirrors would have to be changed when the laser is tuned over the bandwidth of the Ti:sapphire gain medium. If the costs involved in providing the broad band coatings on the all the mirrors was prohibitive, it would be desirable to use the broad band coatings on at least the most expensive of the resonator optics. In this case, the broad band coating should be located on the surface 140 of the GTI so that only one GTI is necessary for the entire tuning range.

While the subject invention has been described with reference to the preferred embodiments, various changes and modifications could be made by one skilled in the art without varying from the scope and spirit of the subject invention as described by the appended claims.

We claim:

1. In an apparatus where a laser beam is incident on a Gires-Tournois interferometer, a system for controlling group velocity dispersion of the Gires-Tournois interferometer comprising:

a Gires-Tournois interferometer upon which said laser beam is incident, said Gires-Tournois interferometer transmitting a portion of the laser beam;

means for measuring the power of the laser beam transmitted through the Gires-Tournois interferometer and generating a discriminant signal in response thereto; and means operating in response to said discriminant signal for adjusting the amount of group velocity dispersion generated by said Gires-Tournois interferometer.

2. In an apparatus where a laser beam is incident on a Gires-Tournois interferometer, a system for maintaining group velocity dispersion of a Gires-Tournois interferometer at a given level as a wavelength of a laser beam is varied comprising:

a Gires-Tournois interferometer upon which said laser beam is incident, said Gires-Tournois interferometer transmitting a portion of said laser beam, said Gires-Tournois interferometer being adjustable to vary the group velocity dispersion for a given incident wavelength;

means for measuring the power of the laser beam transmitted through the Gires-Tournois interferometer and generating a discriminant signal in response thereto; and means operating in response to said discriminant signal for adjusting said Gires-Tournois interferometer in a manner to maintain the group velocity dispersion thereof at a given level as the wavelength of laser beam is varied.

3. An apparatus as recited in claim 2 wherein said Gires-Tournois interferometer includes a pair of opposed plates, with the group velocity dispersion of said Gires-Tournois interferometer being adjustable by varying the spacing between said plates.

4. An apparatus as recited in claim 3 wherein said means operating in response to said discriminant signal is a PZT operatively connected to said Gires-Tournois interferometer and functioning to adjust the spacing between said plates.

5. A laser comprising:
a resonant cavity;
a gain medium located within the resonant cavity;
means for exciting the gain medium;
means for mode locking said resonant cavity to generate a pulsed laser beam;
means for varying a wavelength of the laser beam;
a Gires-Tournois interferometer located in the path of said laser beam and having a negative group velocity dispersion for controlling the character of laser pulses;
means for measuring power of the laser beam transmitted through the Gires-Tournois interferometer and generating a discriminant signal in response thereto; and
means operating in response to said discriminant signal for adjusting said Gires-Tournois interferometer in a manner to maintain the group velocity dispersion thereof at a given level as the wavelength of laser beam is varied.

6. A laser as recited in claim 5 further including a means for measuring intracavity power of the laser beam and generating an output signal, said output signal being used to normalize measurement of power transmitted through the Gires-Tournois interferometer.

7. A laser as recited in claim 5 further including a means for adjusting the Gires-Tournois interferometer to dither the power transmitted therethrough and wherein the discriminant signal generated by said measuring means is based on second derivative of the measured power with respect to the adjustment.

8. In a system where a laser beam is incident on a Gires-Tournois interferometer, a method for controlling a group velocity dispersion of a Gires-Tournois interferometer comprising the steps of:
measuring power of the laser beam transmitted through the Gires-Tournois interferometer and generating a discriminant signal in response thereto; and
adjusting an amount of group velocity dispersion generated by said Gires-Tournois interferometer in response to said discriminant signal.

9. In a system where a laser beam is incident on a Gires-Tournois interferometer, a method for maintaining group velocity dispersion of a Gires-Tournois interferometer at a given level as a wavelength of a laser beam is varied comprising the steps of:
measuring power of the laser beam transmitted through the Gires-Tournois interferometer and generating a discriminant signal in response thereto; and
adjusting said Gires-Tournois interferometer in response to said discriminant signal in a manner to maintain the group velocity dispersion thereof at a given level as the wavelength of laser beam is varied.

10. A method of operating a tunable pulsed laser, including a laser generating a mode locked laser beam having a means for varying a wavelength of the laser beam, said laser including a Gires-Tournois interferometer having a negative group velocity dispersion for controlling character of the pulses, said method comprising the steps of:
varying the wavelength the laser beam;
measuring power of the laser beam transmitted through the Gires-Tournois interferometer and generating a discriminant signal in response thereto; and
adjusting said Gires-Tournois interferometer in response to said discriminant signal in a manner to maintain the group velocity dispersion thereof at a given level as the wavelength of laser beam is varied.

11. A mode locked laser generating a pulsed output beam comprising:
a resonant cavity having at least two optically reflective surfaces;
a broad band gain medium located within the resonant cavity;
means for exciting the gain medium to generate a laser beam;
means for mode locking the cavity to generate a pulsed laser beam;
a Gires-Tournois interferometer located in the resonant cavity and in the path of the pulsed laser beam, said Gires-Tournois interferometer having a negative group velocity dispersion for controlling character of the pulses; and
a broad band optical coating formed on at least one of said reflective surfaces of said resonant cavity, said coating including at least two substantially quarter wave stacks, each stack being optimized for reflection at a different laser wavelength within a bandwidth of the gain medium, with said coating generating dispersion effects and wherein said Gires-Tournois interferometer is adjusted to compensate for the dispersion effects of said coating.

12. A laser as recited in claim 11 wherein said optical coating is reflective over at least a 200 nanometer range.

13. A laser as recited in claim 11 wherein said gain medium is titanium:sapphire.

14. A laser as recited in claim 11 wherein said laser pulses are in a picosecond regime.

15. A mode locked laser generating a pulsed output beam comprising:
a resonant cavity having at least two optically reflective surfaces;
a broad band gain medium formed from titanium:sapphire and located within the resonant cavity;

means for exciting the gain medium to generate a laser beam;

means for mode locking cavity laser to generate a pulsed laser beam wherein the pulses are in a picosecond regime;

a Gires-Tournois interferometer located in the resonant cavity and in the path of the pulsed laser beam, said Gires-Tournois interferometer having a negative group velocity dispersion for controlling a character of the pulses; and a broad band optical coating formed on at least one of said reflective surfaces of said resonant cavity, said coating being reflective over a range greater than 200 nanometers, said coating including at least two quarter wave stacks, each stack being optimized for reflection at a different wavelength, with said coating creating dispersion effects and wherein said Gires-Tournois interferometer is adjusted to compensate for the dispersion effects of said coating.

* * * * *